Jan. 14, 1947. R. E. BARCLAY 2,414,082
HEATER UNIT FOR TOASTERS
Filed Jan. 6, 1945 2 Sheets-Sheet 2
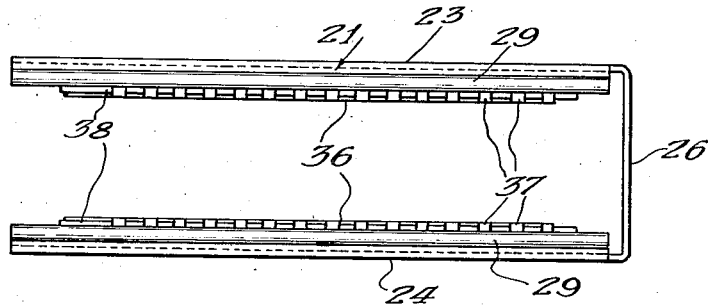
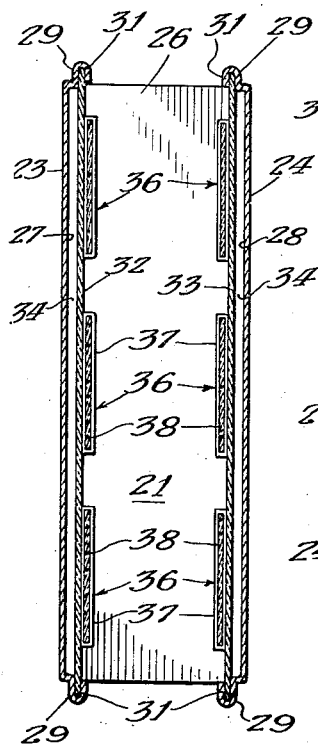
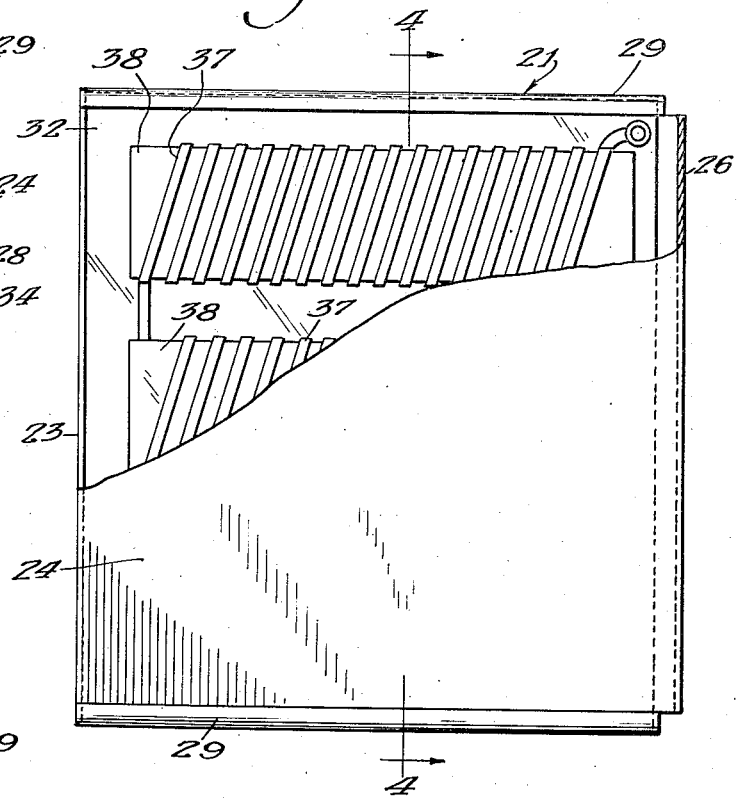
Inventor:
Robert E. Barclay
By: Lee J. Gary
Attorney.

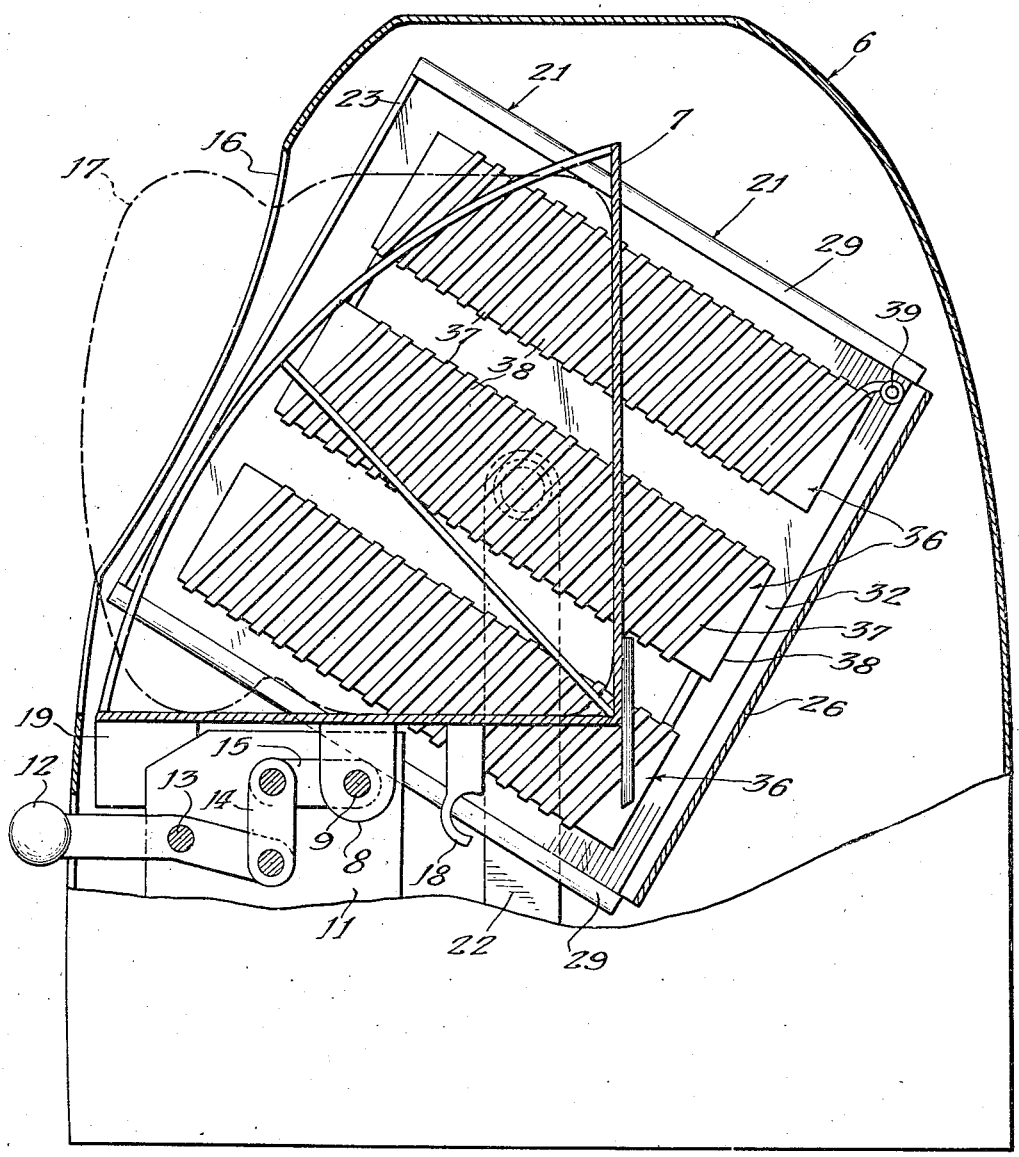

Patented Jan. 14, 1947

2,414,082

UNITED STATES PATENT OFFICE 2,414,082

HEATER UNIT FOR TOASTERS

Robert E. Barclay, Chicago, Ill., assignor to Federal Electric Company, Inc., Chicago, Ill., a corporation of New York Application January 6, 1945, Serial No. 571,609

1 Claim. (Cl. 219—19)

This application is a continuation in part of my co-pending application, Serial No. 552,971 filed September 7, 1944 for improvements in toasters. This invention is more particularly concerned with improvements in heater units for toasters and contemplates the provision of a heater unit embodying plates provided with bright reflecting faces for directing heat from electrical resistance units toward bread to be toasted, and in which the heating elements are mounted on sheets of mica disposed in spaced parallel relation to their respective reflecting faces to provide air spaces therebetween.

This invention further contemplates the provision of a heater unit in which a U-shaped plate is arranged to straddle a toast carrier and is formed with opposing chromium plated heat reflecting faces.

This invention also contemplates the provision of means for detachably connecting sheets of mica in spaced relation to their respective heat reflecting faces provided on the U-shaped plate.

This invention embodies other novel features, details of construction and arrangement of parts which are hereinafter set forth in the specification and claims, and illustrated in the accompanying drawings wherein:

Fig. 1 is a side elevational view partly in section showing a toaster embodying features of this invention.

Fig. 2 is a detailed plan view showing a heater unit embodying features of this invention.

Fig. 3 is a side elevational view, partly in section, showing the heater unit.

Fig. 4 is a sectional view taken along the line 4—4 of Fig. 3.

Referring now to the drawings for a better understanding of this invention, the toaster is shown as comprising a housing 6 adapted to receive one or more toast carriers 7 which are provided with downwardly extending ears 8 for engagement on a shaft 9. The ears 8 are secured against movement relative to the shaft 9 by any suitable means, and the shaft is journaled in suitable bearings provided in a pair of spaced supporting plates 11.

An operating handle 12 is journaled on a shaft 13 secured to the supporting plates 11, and has its free end operatively connected to the carrier shaft 9 by means of a connecting link 14 and a lever 15. The lever 15 is secured against movement relative to the shaft 9.

Th housing 6 is provided with one or more elongated openings 16 through which slices of bread 17 may be inserted for positioning on their respective toast carriers 7. Each toast carrier is movable from its loading position, shown in Fig. 1, to a toasting position by moving the outer end of its respective handle 12 downwardly until a hook member 18 becomes engaged under a suitable latch, not shown. Upon release of the latch, the toast carrier is adapted to pivot from its loading position to its toasting position by gravity due to the action of a counterweight 19 mounted upon the forward end of the carrier.

Each carrier 7 is provided with a heating unit which is generally indicated at 21, and adapted to be supported in proper position within the housing 6 by means of suitable supporting brackets 22 which are welded or otherwise secured to opposite sides of the heating unit. As illustrated in Figs. 2 to 4, each heating unit comprises a U-shaped plate provided with side walls 23 and 24 and a connecting end wall 26. The opposing faces 27 and 28 of the sides 23 and 24, respectively, are provided with bright, highly polished heat reflecting surfaces. The opposing faces 27 and 28 are preferably chromium plated in order to provide the desired heat reflecting characteristics and to insure durability and long service life. However, it is contemplated that reflecting surfaces may be manufactured by means other than those described. Inwardly disposed flanges 29 are provided along the top and bottom edges of the sides 23 and 24 and are preferably formed with guide grooves 31 to receive a pair of mica sheets 32 and 33. The mica sheets are disposed in spaced relation to their respective reflecting faces 27 and 28 to provide air spaces 34 therebetween. The guide grooves 31 are disposed in parallel alignment in order that substantially square or rectangular sheets of mica may be mounted therein by moving same longitudinally through the slots.

Electrical resistance elements 36 are mounted on the face of each sheet of mica 32 and 33, and are preferably formed by spirally winding resistance wire 37 around a rectangular sheet of mica 38. The resistance elements 36 may be secured to the mica sheets 32 and 33 by any suitable means. If desired, several resistance elements 36 may be provided on the face of each sheet of mica and wired in series for electrical connection with suitable terminals 39.

By mounting the resistance elements upon sheets of mica and in spaced relation to their respective heat reflecting surfaces 27 and 28, it has been found that the heating unit provides a greater efficiency than other forms of heating units heretofore employed in toasters. In the use of a heating unit of the type shown and described in toasters, it has also been found that the housing remains relatively cool and may be constructed without the use of the usual interior insulation due to the fact that the heat from heating elements 36 is adequately confined between the sides 23 and 24 of the U-shaped plate.

While this invention has been shown in but one form, it is obvious to those skilled in the art that it is not so limited but is susceptible of various changes and modifications without departing from the spirit and scope of the claimed invention.

I claim as my invention:

In a heater unit for a toaster having a toast carrier, a pair of reflector plates arranged in spaced parallel alignment on opposite sides of said toast carrier, a connecting wall for said reflector plates, a sheet of mica disposed in spaced parallel alignment with the inner face of each reflector plate to provide an air space therebetween, means defining parallel grooves on opposite edges of said reflector plates for detachable engagement with said mica sheets, and electrical resistance units mounted on the side of the mica sheets adjacent the toast carrier.

ROBERT E. BARCLAY.